United States Patent [19]

Hart et al.

[11] Patent Number: 5,079,773
[45] Date of Patent: Jan. 7, 1992

[54] TAILORED CROSS SECTION OPTICAL WAVEGUIDE LASER ARRAY

[75] Inventors: Richard A. Hart, Stewart; Kennedy, Jr. John T., Palm City; Leon A. Newman, Stewart, all of Fla.

[73] Assignee: United Technologies Corporation, Hartford, Conn.

[21] Appl. No.: 641,389

[22] Filed: Jan. 15, 1991

[51] Int. Cl.$^5$ ............................................. H01S 3/098
[52] U.S. Cl. ........................................ 372/18; 372/64; 372/82
[58] Field of Search ................... 372/18, 64, 61, 92, 372/82, 55

[56] References Cited

U.S. PATENT DOCUMENTS

| 4,807,232 | 2/1989 | Hart et al. | 372/64 |
| 4,807,233 | 2/1989 | Hart et al. | 372/18 |
| 4,807,234 | 2/1989 | Hart et al. | 372/18 |

Primary Examiner—Léon Scott, Jr.
Attorney, Agent, or Firm—Peter R. Ruzek

[57] ABSTRACT

A phase-locked ridge waveguide gas laser includes a body that circumferentially bounds an elongated internal space extending along a longitudinal main plane and bisected by a longitudinal central plane. The internal space contains a gaseous lasing medium that is excited at radio frequency with attendant light emission from the gaseous medium. Mirrors are so positioned relative to the body as to provide lasing of the light emission. Respective ridges partition the internal space into a plurality of laser resonator cavities each sustaining a guided mode of the lasing light emission. Each of the cavities extends longitudinally of the body and is spaced from an adjacent cavity by a predetermined distance in a width direction of the internal space. At least the height dimension, as considered along the central plane, of at least a first of the cavities that is more remote from the central plane is smaller than that of a closer second of the cavities to an extent dependent on a variation in a propagation constant of the guided lasing light mode in the gaseous lasing medium contained in such cavities as the laser is in operation.

5 Claims, 3 Drawing Sheets

TAILORED CROSS SECTION OPTICAL WAVEGUIDE LASER ARRAY

The Government has rights in this invention pursuant to a contract awarded by the Department of the Air Force.

TECHNICAL FIELD

This invention relates to waveguide lasers in general, and more particularly to $CO_2$ waveguide lasers having an array of phase locked resonators separated from each other by respective ridges.

BACKGROUND ART

There are already known various constructions of gas lasers, among them such having hollow dielectric waveguides. A particular advantage of the lasers of the latter type is that they are more compact than other gas lasers. Reducing the dimensions of the passage of the discharge housing provides increased gain, higher power generated per unit volume and an improved saturation parameter. This increase in power is achieved, as a result of the existence of well defined, low loss modes of laser propagation, despite the fact that linear gas waveguides leak radiation into the walls of the dielectric. The performance enhancements result from favorable de-excitation of the gas by wall collisions, from device operation at increased gas pressure, and from reduction in gas temperature due to the improved thermal conduction provided by the waveguide walls.

Recently developed configurations of waveguide gas lasers have produced a substantial increase in laser output power per unit volume in sealed-off (no gas flow or makeup) devices. One way of increasing the output from a gas laser device is to increase its effective length. However, the use of this technique in long life devices is limited due to the high intracavity flux levels incident on the resonator optics. So, for example, in a 100 watt Z-folded gas laser device, the peak flux density on the turning optics for a resonator employing a 25 percent output coupling mirror is at a level of about 30 kW/cm$^2$.

One method by which one could substantially reduce this flux level is to increase the diameter of the waveguide all over its entire length. However, when this is done, there is experienced a loss in transverse mode discrimination, and transverse mode beating results. A 100 watt waveguide laser would also have a gain length of approximately 180 cm. The longitudinal mode spacing given by c/2 would be 83 MHz. Consequently, if the application of the laser required an offset in frequency from line center of approximately 41 MHz, longitudinal mode beating would occur, limiting the utility of the laser, especially in some coherent ladar applications.

An approach by which all of the above problems, namely the high intracavity flux density and the limited longitudinal mode spacing, can be circumvented is to use a phase-locked array of waveguide lasers. An early implementation of this approach is disclosed in a commonly assigned U.S. Pat. No. 4,688,228, in which a plurality of resonator cavities is arranged next to one another, with each adjacent two of such cavities being separated from each other only incompletely by a ridge which extends from one of the major internal surfaces bounding the cross-sectionally rectangular internal space of the laser body toward the other major surface, but which terminates short of such other major surface.

Experience with this waveguide gas laser arrangement has shown that it operated well when only two of such resonator cavities were provided. However, when the number of the resonator cavities that are arranged next to one another was increased to three or more, with all of the ridges still extending from one and the same major surface, problems were encountered with the quality of the combined laser beam emerging from the laser arrangement and particularly with phase locking between and among the resonator cavities. Such problems are attributable to the fact that a large open or unguided region exists at one of the major surfaces bounding the internal space subdivided by the ridges into individual resonator cavities. This open region not only permits radiation to leak from one of the resonator cavities to the adjacent one to achieve the desirable phase locking, but also, to a great disadvantage, brings about conditions in which higher-order transverse modes may and often will develop. As a consequence, a great number of transverse mode beats was observed in laser arrangements having several adjacent resonator cavities connected with one another by such a large open region.

Moreover, the gain and mode volumes of the previously proposed gas laser arrangements of this type, which are provided with cross-sectionally rectangular or U-shaped channels forming the resonator cavities, are not well matched to one another. This means that such channels include corners in which the gaseous lasing medium is being pumped and, as a result, exhibits gain. This has two disadvantageous consequences. First, the power dissipated in the corners so such cross-sectionally rectangular or U-shaped channels is wasted, resulting in a diminished efficiency of the gas laser arrangement. Secondly, gain within the corner regions can support modes other than the desired EH$_{11}$ mode, resulting in mode beating in the outgoing laser beam and in further reduction in the useful power of such output laser beam.

Examples of gas laser cavity array arrangements which address at least the last-mentioned concern are disclosed in commonly assigned U.S. Pat. Nos. 4,807,232, 4,807,233 and 4,807,234, all issued on Feb. 21, 1989, as much of the disclosure of which as may be needed for supplementing the present invention, especially with respect to additional details and modifications that may be used in conjunction therewith, is incorporated herein by reference. Using the U.S. Pat. No. 4,807,233 as an example of a gas laser array arrangement in which the present invention may be employed to particular advantage, it is to be mentioned that, in this arrangement, the adjacent channels constituting the respective individual laser cavities are also separated from one another only incompletely by respective ridges so as to achieve the desired phase locking. This time, however, each of the ridges is constituted by a pair of projections each extending, in alignment with the other projection of the pair, from a different one of the major internal surfaces bounding the internal space of the laser body, and terminating short of the other projection to provide a gap through which the phase locking between the respective adjacent laser cavities takes place. In an attempt to match the gain volumes of the laser cavities to their respective mode volumes, these projections have been given identical generally cusp-shaped configurations, so that all of the individual laser cavities that are bounded thereby also have identical configurations, including identical cross sectional shapes.

Unfortunately, experience has shown that there exists a problem which limits the performance of the gas laser array not only of this type but also of other types, including those in which the phase locking between and among the laser cavities is achieved in a manner different from that used in the above patents, such as externally of the laser array proper, this problem being attributable to the fact that the temperature of the gaseous lasing medium is higher in the central region of the array than in the outermost regions. As a matter of fact, a temperature gradient is encountered in the transverse direction of the laser cavity array (along a main plane of the array or of an internal space of the laser body), with the temperature decreasing in each direction from a central plane of the array or internal space. This temperature gradient shifts or profiles the index of refraction transversely of the array. When such a temperature profiled array was operated with each of the laser cavities constituting an independent oscillator (not phase-locked) so as to be able to individually detect characteristic properties of the laser beams issuing from such cavities without being influenced by what was taking place in the other cavities, a spread in the operating frequencies was observed.

This spread in optical frequencies has a number of detrimental effects. First, if the individual resonator frequency is too large, phase locking with reasonable coupling is not achievable. Secondly, multiple modes may lase (mode beating). Thirdly, the output power level is degraded for staggered coupled devices of the type disclosed in the U.S. Pat. No. 4,807,232.

Accordingly, it is a general object of the present invention to avoid the disadvantages of the prior art.

More particularly, it is an object of the present invention to provide a waveguide gas laser arrangement which does not possess the disadvantages of the known arrangements of this type.

Still another object of the present invention is so to construct the arrangement of the type here under consideration as to provide low-loss phase coupling between and among the adjacent resonator cavities despite the existence of temperature differences or gradient in the gaseous lasing medium contained in such cavities.

A concomitant object of the present invention is so to design the above arrangement as to be relatively simple in construction, inexpensive to manufacture, easy to use, and reliable in operation nevertheless.

DISCLOSURE OF THE INVENTION

The above objects and others which will become apparent hereafter are achieved by a phase-locked ridge waveguide laser that includes a body that circumferentially bounds an elongated internal space extending along a main plane and a central plane that are respectively defined by respective length and width directions, and length and height directions, of the internal space. The internal space contains a gaseous lasing medium, and excitation means is disposed on the body and is operative for exciting the gaseous medium at radio frequency with attendant light emission from the gaseous medium. The arrangement further includes light-reflecting means so positioned relative to the body as to provide lasing of the light emission, and partitioning means which includes a plurality of ridges extending across the internal space along the height direction and at least partially partitioning the internal space into a plurality of laser resonator cavities each sustaining a guided mode of the lasing light emission, in such a manner that each of the cavities extends along the length direction, is spaced from an adjacent cavity by a predetermined distance in the width direction, and has a height dimension as considered in the height direction. In accordance with the present invention, at least the height dimension of at least a first of the cavities that is more remote from the central plane is smaller than that of a closer second of the cavities to an extent dependent on a variation in a propagation constant of the guided lasing light mode in the gaseous lasing medium contained in such cavities during the operation of the laser.

A particular advantage of the arrangement as described so far is that, as a result of the tailoring of the cross sections of the cavities in accordance with the temperature differences existing during the stead-state operation of the gas laser arrangement, the previously experienced optical power losses which have been attributed to the frequency and thus phase differences between the laser light generated in such individual cavities are reduced to a minimum, if not eliminated altogether, thus significantly improving the energy conversion efficiency of the laser array arrangement as compared to previously known devices of this type.

BEST MODE FOR CARRYING OUT THE INVENTION

Figure 1:
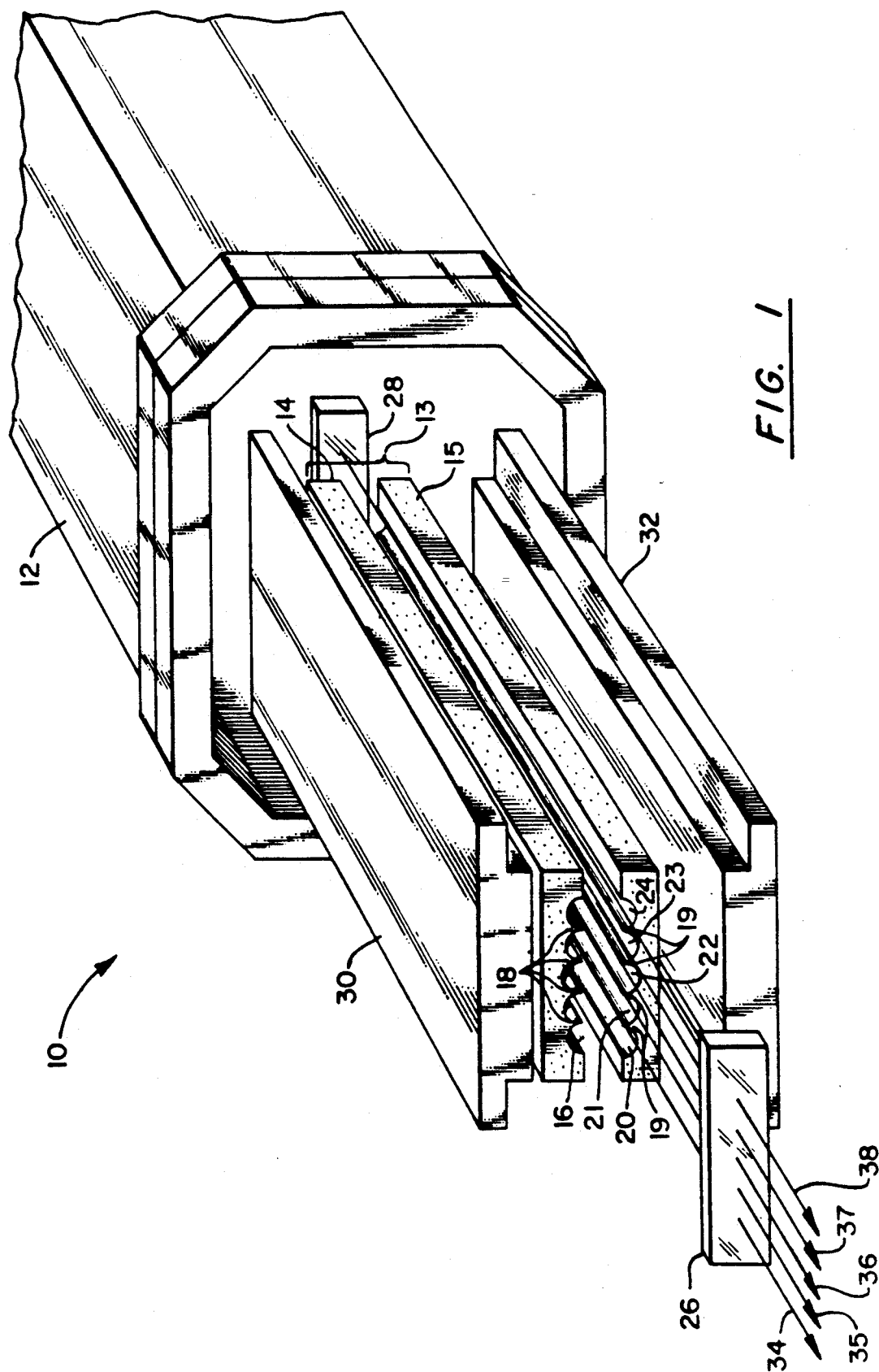
FIG. 1 is an exploded perspective view of a phase locked cusp-shaped ridge waveguide array gas laser assembly embodying the present invention.

Referring now to the drawing in detail, and first to FIG. 1 thereof, it may be seen that the reference numeral 10 has been used therein to identify a gas laser in its entirety. As illustrated, the gas laser 10 employing the present invention is constructed as a phase locked cusp-shaped ridge waveguide gas laser similar to that disclosed in the aforementioned U.S. Pat. No. 4,807,233; however, it should be realized that this particular construction has been chosen for illustrative purposes only and is only one of many which could benefit from the use of the present invention.

The laser 10 as illustrated comprises a housing 12 made from bakable aluminum or equivalent. The housing 12 contains a dielectric body 13 which consists of two components 14 and 15, and is made from a ceramic material or equivalent. The components 14 and 15 bound an internal space 16 upon assembly of the body 13. The housing 12 also includes end covers and a gas port in the housing (not shown) enabling the device to be evacuated and back filled with a lasing gas that is also not illustrated.

Inside the internal space 16 are longitudinal ridges 18, 19 formed on the components 14 and 15 of the body 13 by conventional techniques. These ridges 18 and 19 are shown to jointly define five optical resonators 20, 21, 22, 23, and 24, as an example. As will be detailed hereinafter in conjunction with FIG. 2, the ridges 18 and 19 fall short of meeting one another at their crests so that they leave free spaces or gaps therebetween, thus enabling the laser light generated in the cavities or resonators 20 to 24 to couple and phase lock. Obviously, the dimensions of the resonators 20 to 24 must be selected to sustain lasing in a selected mode to be able to achieve the desired kind of such optical coupling between the resonators or cavities 20, 21, 22, 23, and 24. In the best mode embodiment, the length of the resonators 20 to 24 is approximately 37 cm, although other lengths may be substituted. The dielectric material selected to comprise the components 14 and 15 of the body 13 can be a ceramic material of a type known in the art, such as aluminum oxide ($Al_2O_3$) and in the best mode embodiment comprises beryllium oxide (BeO). Those skilled in the art will note that the ridges 18 and 19 may comprise a different dielectric than the remainders of the components 14 and 15 of the ceramic body 13 and may equivalently be fabricated separately from the body 13 and subsequently positioned in the internal space 16 during assembly.

Mirrors 26 and 28 are located by conventional techniques at either end of the body 13 or within the end covers of the housing 12 perpendicular to the resonators 20 to 25. They are made from conventional materials known in the art, such as zinc selenide, and are chosen to be reflective of a selected percentage of incident light at a selected wavelength.

The lasing gas is a conventional mixture, and in the best mode embodiment comprises a mixture of 4% xenon, 12% carbon dioxide, 20% nitrogen and 64% helium by mole fraction at a pressure of 100 Torr. Those skilled in the art will note that other equivalent mixtures and pressures may be equivalently substituted.

Also included are radio frequency electrodes 30 and 32 which are of a conventional type and extend over the entire length of the resonators 20 to 24. In the best mode embodiment, the electrodes 30 and 32 comprise copper or aluminum sheet at least 20 thick for excitation at 145MHz. If other excitation frequencies are substituted, the thickness of the electrodes 30 and 32 must be chosen to be greater than the skin depth. The electrodes 30 and 32 are attached to the body 13 by conventional techniques.

When assembled, the housing 12 is evacuated and then filled with the lasing gas. Radio frequency excitation is provided to the RF electrodes 30 and 32 via a conventional RF feedthrough in the housing 12 (not shown) and produces an electrical excitation of the gas. As is well known in the art, proper selection of the optical parameters and gas pressures will result in lasing of the device. Guided mode optical signals 34, 35, 36, 37, and 38 will be produced in the respective resonators 20, 21, 22, 23, and 24.

Experience with the laser arrangement 10 as described so far herein has shown that, when all of the cavities 20 to 24 had identical cross-sectional configurations as was customary prior to the present invention, its output power output, and the quality of the output laser beams 34 to 38, were lower than expected. In searching for the cause of this rather disappointing performance of such a laser arrangement 10, it was established that, during the operation of the laser 10, a temperature gradient develops in the transverse (as illustrated, horizontal) direction of the internal space 16, with temperature being the highest in the centrally located cavity 22, and gradually decreasing in the directions toward the outermost cavities 20 and 24, respectively. Further experiments conducted with a laser arrangement that was modified relative to the one described above in that its cavities were completely separated from one another so as to be able to assess their individual performances without being influenced by the events taking place in the other cavities, it was established that the laser light issuing from such individually operated (uncoupled) cavities was at different frequencies. This had lead to the conclusion, which was subsequently confirmed, that such frequency differences detract from efficient coupling between the coupled cavities 20 to 24 of the arrangement 10 and thus result in optical power losses at the regions of the gaps between the ridges 18 and 19 or elsewhere.

Having thus discovered the reason behind the problem (the temperature differences or gradient), the next logical step was to search for a solution avoiding this problem. However, to be able to do so, it was necessary to realize that the differences in the lasing frequencies of the individual cavities were attributable to the fact that the different temperatures prevailing in the individual cavities resulted in commensurately different refractive indices of, and thus in different propagation constants of the lasing light through, the lasing medium contained in such cavities, with attendant changes in the effective lengths of such cavities. Based on this realization, it is proposed in accordance with the present invention to shift the individual cavity frequency of at least one of the an array elements by changing its propagation constant.

Figure 2:
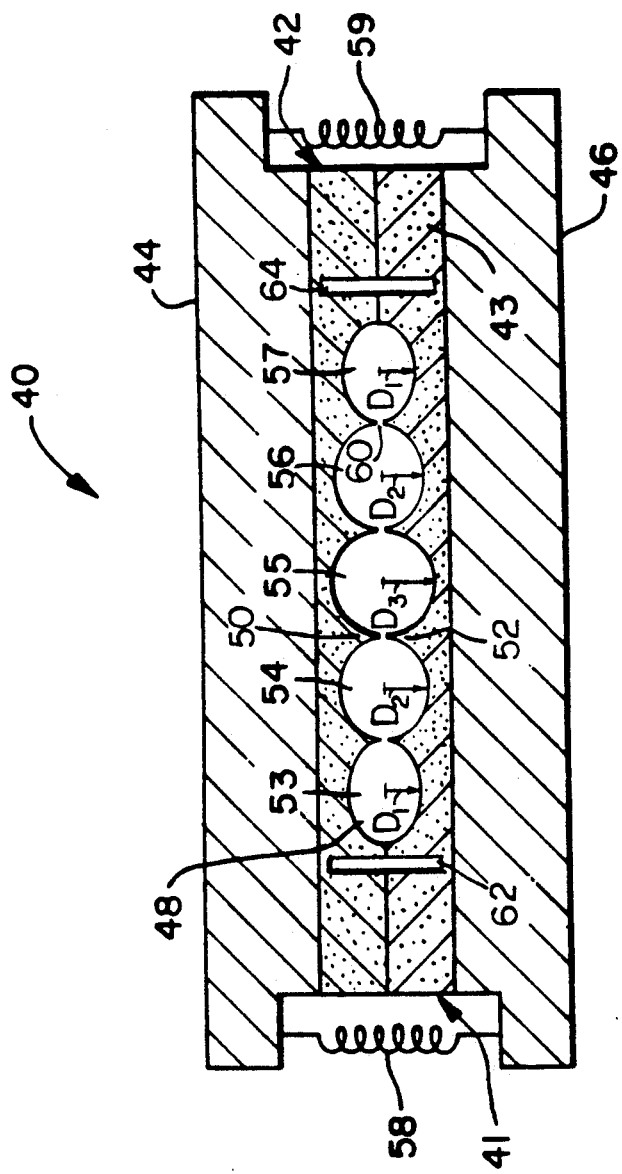
FIG. 2 is a cross-sectional view of an assembly of main operative components of the assembly of FIG. 1.

This can be accomplished, in a manner which is shown in more detail in FIG. 2 of the drawing, by changing the cross-sectional area of the affected waveguide or cavity. It may be seen on FIG. 2, which is a sectioned illustration of a portion 40 of the phase locked ridge waveguide gas laser of FIG. 1 but showing some additional details, a dielectric body 41, which consists of components 42 and 43, is bounded by an upper RF electrode 44 and a lower RF electrode 46. Within an internal space 48 are ridges 50 and 52 which form respective resonators 53, 54, 55, 56, and 57. Each of the ridges 50 and 52 extends into the internal space 48 from a different one of the components 42 and 43. Each two ridges 50 and 52 which are aligned with one another in the vertical direction as considered in FIG. 2 constitute a respective pair. The internal space 48 and the ridges 50 and 52 formed in the body 41 are fabricated by techniques well known in the art. Also illustrated are discrete inductor coils 58 and 59 located between the upper and lower RF electrodes 44 and 46 on either side of the body 41. The inductors 58 and 59 comprise part of the distributed inductance parallel resonant circuit described hereinabove with respect to FIG. 1.

In accordance with the present invention, the above-stated objective of changing the laser light propagation constants through the cavities 53 to 57 in such a manner as to bring the operating frequencies of the cavities 53 to 57 in as close a proximity to one another as possible or feasible, was accomplished in accordance with the present invention by changing the configurations of the ridges 50 and 52 in such a manner as to give the cavities 53 to 57 different height dimensions. This is indicated in FIG. 2 by respective dimensions $D_1$, $D_2$ and $D_3$ representative of the depths, as measured from a parting plane between the components 42 and 43 of the body 41, of the grooves that are provided in the components 42 and 43 and jointly form the cavities 53 to 57. It may be seen that the magnitude of such dimensions gradually decreases from $D_1$ in the centrally located cavity 55 to $D_3$ in the outermost cavities 53 and 57, and that, as a consequence, while the cavity 55 has a circular cross section, the cavities 54 and 53, on the one hand, and 56 and 57, on the other hand, have elliptical cross sections with gradually decreasing magnitude of the minor axis. However, it is also contemplated in accordance with the present invention to make all of the cavities 53 to 57 cross-sectionally circular, in which case the dimensions $D_1$, $D_2$ and $D_3$ would be representative of the respective diameters of such cross-sectionally circular cavities 53 to 57.

Figure 3:
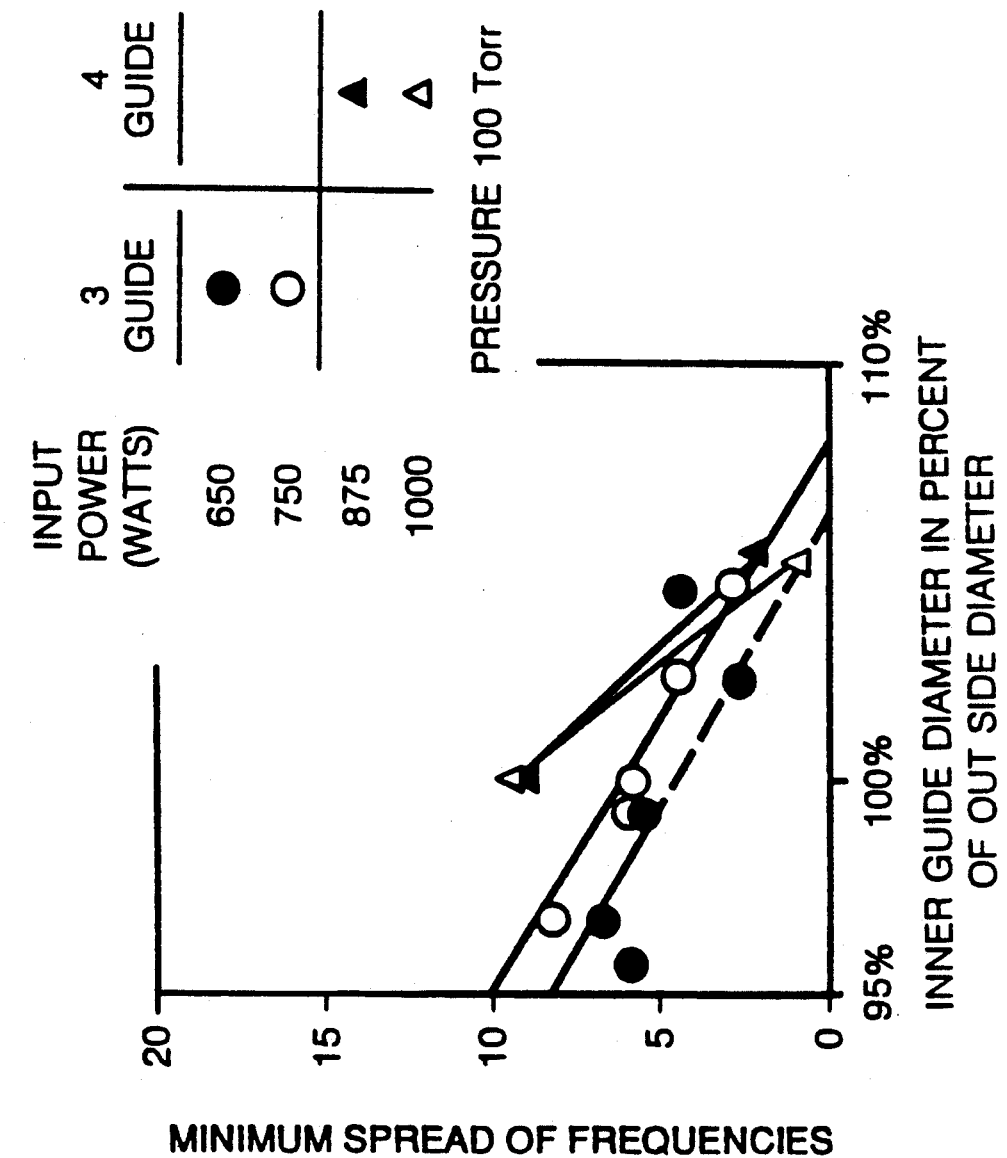
FIG. 3 is a graphic representation showing the beneficial effect of the use of the present invention on the frequency spread between the various cavities.

Tests were conducted with certain uncoupled waveguide gas laser constructions to confirm the expected beneficial results of the present invention. FIG. 3 is a graphic representation of the data collected for the minimum spread of frequencies (MSF) for a three element and four element array of such uncoupled waveguides. The data shows how the spread in frequencies can be reduced by simply tuning or tailoring the guide diameters across the array. In the case of the three waveguide array, when the center waveguide of the array was made larger in cross section (105 percent of the outside element diameter), the MSF fell to 2.5 MHz. Had the array had equal guide diameters, the MSF would have been greater than 5 MHz.

The MSF of an array increases even more significantly as the number of elements in the array increases. This can be seen in the four element case with equal waveguide diameters where the spread in frequencies for the array is 9 MHz in the absence of the use of the expedient proposed by the present invention. By increasing the effective cross section of the center two elements to 106 percent of the that of the two outer elements, the spread in frequencies was reduced to 1 MHz.

Although four ridges 50 and 52 creating five resonators 53 to 57 are shown in FIGS. 1 and 2, those skilled in the art will note that a greater or lesser number of ridges delineating a greater or lesser number of resonators may be selected. Such ridges will then extend into the internal space 48 in respective pairs from the components 42 and 43. Moreover, although only a linear array of parallel resonators is illustrated, those skilled in the art will recognize that other geometrical resonator configurations such as cylindrical or opposed linear array of parallel resonators may be similarly chosen.

In the construction depicted in FIGS. 1 and 2 of the drawing, unlike in those used during the testing where the cavities were totally optically separated from one another, the height of the ridges 50 and 52 is selected to be less than half the height of the internal space 48 so that there is less than total physical separation between each adjacent two of the resonators 53 to 57. A gap 60 exists between the ridges 50 and 52. The gap 60 enables optical energy to leak between the adjacent ones of the resonators 53 to 52. The amount of optical coupling between adjacent resonators 53 to 57 is controlled by the gap dimension and width of the ridges 50 and 57 which form the separation between the respective adjacent resonators 53 to 57.

The gap 60 also allows the parallel electrical excitations in the resonators 53 to 57 to couple to one another, thereby obtaining uniform discharges and good initiation of all discharges within the individual resonators 53 to 57. Moreover, as a result of the dimensional changes in accordance with the present invention, there is an excellent agreement between the frequencies at which the lasing would take place in the cavities or resonators 53 to 57 were they operated independently, so that the previously encountered losses attributable to the frequency differences, and the resulting impossibility to achieve efficient, low-loss, phase locking between the laser light propagating in the cavities 53 to 57, are eliminated or at least reduced to an achievable minimum.

Here again, like in the aforementioned patent, the gap dimension must be a small fraction of the internal space height, in order to operate in the lowest order mode. In the best mode embodiment, the internal space depth is between 0.1 and 0.5 cm. The resonator width is between 0.1 and 0.5 cm, and the gap 60 is ideally only 0.33 millimeter.

The above technique was utilized in the seven element mid-power laser. The best performance that could be achieved from an untailored array was 92 watts, and single mode generation was difficult to obtain. When the guides were tailored, however, the performance increased to 120 watts and single mode operation was easily obtained.

It is also shown in FIG. 2 of the drawing that the components 42 and 43 of the body 41 are provided with respective aligned recesses arranged next to and outwardly of the respective cavities 53 and 57 and forming respective voids 62 and 64. These voids constitute respective thermal barriers that prevent the temperatures prevailing at least in the outer cavities 53 and 57 from falling below those existing in the adjacent cavities 54 and 56 and ultimately in the central cavity 55 to as high a degree as they would were the voids 62 and 64 not provided. This expedient is helpful in establishing the desired frequency coincidence or closeness between and among the cavities 53 to 57; however, it would not suffice if used by itself.

Even though the invention has been shown and described with respect to a best mode embodiment thereof, it should be understood by those skilled in the art that various other changes, omissions and additions thereto may be made therein, without departing from the spirit and scope of the invention.

We claim:

1. A phase-locked ridge waveguide laser, comprising:
 a body circumferentially bounding an elongated internal space extending along a main plane and a central plane that are respectively defined by respective length and width directions, and length and height directions, of said internal space;
 a gaseous lasing medium contained in said internal space;
 excitation means disposed on said body for exciting said gaseous medium at radio frequency with attendant light emission from said gaseous medium;
 light-reflecting means so positioned relative to said body as to provide lasing of said light emission; and
 partitioning means including a plurality of ridges extending across said internal space along said height direction for at least partially partitioning said internal space into a plurality of laser resonator cavities each sustaining a guided mode of the lasing light emission, each of said cavities extending along said length direction, being spaced from an adjacent cavity by a predetermined distance in said width direction, and having a height dimension as considered in said height direction, at least said height dimension of at least a first of said cavities that is more remote from said central plane being smaller than that of a closer second of said cavities to an extent dependent on a variation in a propagation constant of said guided lasing light mode in the gaseous lasing medium contained in such cavities during the operation of the laser.

2. The gas laser as defined in claim 1, wherein said first cavity is each of those two of said cavities that are most remote from said central plane.

3. The gas laser as defined in claim 2, wherein said second cavity is located at said central plane; wherein said plurality of cavities includes additional ones of said cavities situated between said first and second cavities; and wherein at least said height dimensions of said additional cavities are between those of said first and second ones of said cavities.

4. The gas laser as defined in claim 3, wherein at least said height dimensions of said additional cavities gradually decrease in direction from said second to said first of said cavities.

5. The gas laser as defined in claim 1, and further comprising means for forming respective thermal barriers in said body next to and outwardly of each of those two of said cavities that are most remote from said central plane.

* * * * *